(12) United States Patent
Dickinson, III et al.

(10) Patent No.: US 8,377,408 B2
(45) Date of Patent: Feb. 19, 2013

(54) PROCESS FOR THE PRODUCTION OF CARBON NANOPARTICLES AND SEQUESTRATION OF CARBON

(75) Inventors: Ben Wade Oakes Dickinson, III, San Francisco, CA (US); Robert Wayne Dickinson, San Rafael, CA (US); Jon K. Myers, San Rafael, CA (US); Oliver Douglas Ousterhout, Belvedere, CA (US)

(73) Assignee: High Temperature Physics, LLC, Novato, CA (US)

( * ) Notice: Subject to any disclaimer, the term of this patent is extended or adjusted under 35 U.S.C. 154(b) by 0 days.

(21) Appl. No.: 13/090,053

(22) Filed: Apr. 19, 2011

(65) Prior Publication Data

US 2011/0256049 A1  Oct. 20, 2011

Related U.S. Application Data

(60) Provisional application No. 61/326,168, filed on Apr. 20, 2010.

(51) Int. Cl.
*B82B 3/00* (2006.01)
(52) U.S. Cl. .............. 423/445 B; 423/445 R; 977/842
(58) Field of Classification Search .............. 977/842; 423/445 B, 445 R
See application file for complete search history.

(56) References Cited

U.S. PATENT DOCUMENTS

| | | | |
|---|---|---|---|
| 3,748,282 A | 7/1973 | Evans | |
| 3,915,657 A | 10/1975 | Staffin et al. | |
| 4,188,192 A | 2/1980 | Levenson et al. | |
| 4,192,758 A | 3/1980 | Dickey et al. | |
| 4,368,182 A | 1/1983 | Mills et al. | |
| 4,943,301 A | 7/1990 | Nagle et al. | |
| 5,059,407 A | 10/1991 | Wallace et al. | |
| 5,279,716 A | 1/1994 | Sharma | |
| 5,855,678 A | 1/1999 | Sanjurjo et al. | |
| 5,989,517 A | 11/1999 | Richmond et al. | |
| 6,043,306 A | 3/2000 | Imahashi | |
| 6,130,282 A | 10/2000 | Imahashi et al. | |
| 6,143,689 A | 11/2000 | Moy et al. | |
| 6,299,742 B1 | 10/2001 | Pal et al. | |
| 6,676,920 B1 | 1/2004 | Oishi et al. | |
| 6,805,832 B2 | 10/2004 | Mohler et al. | |
| 6,819,034 B1 | 11/2004 | Pavlovsky | |
| 6,936,233 B2 | 8/2005 | Smalley et al. | |
| 7,060,246 B2 | 6/2006 | Oishi et al. | |
| 7,071,258 B1 | 7/2006 | Jang et al. | |
| 7,357,903 B2 | 4/2008 | Zhou et al. | |
| 7,458,384 B1 | 12/2008 | Seal et al. | |
| 7,514,489 B2 | 4/2009 | Granada, Jr. et al. | |
| 7,601,321 B2 | 10/2009 | McKinnon et al. | |
| 7,601,668 B2 | 10/2009 | Zhou et al. | |
| 7,623,340 B1 | 11/2009 | Song et al. | |
| 7,662,321 B2 | 2/2010 | Guo et al. | |
| 7,666,915 B2 | 2/2010 | Zhang et al. | |
| 7,670,588 B2 | 3/2010 | Zhou et al. | |
| 7,718,155 B2 | 5/2010 | Zhang et al. | |
| 7,718,156 B2 | 5/2010 | Zhang et al. | |
| 7,732,859 B2 | 6/2010 | Anderson et al. | |
| 2006/0133982 A1 | 6/2006 | Kinlock et al. | |
| 2008/0118407 A1 | 5/2008 | Grace et al. | |
| 2008/0269086 A1 | 10/2008 | Adhvaryu | |
| 2008/0279755 A1 | 11/2008 | Spencer | |
| 2009/0020764 A1 | 1/2009 | Anderson et al. | |
| 2009/0033164 A1 | 2/2009 | Khan | |
| 2009/0068470 A1 | 3/2009 | Choi et al. | |
| 2009/0075083 A1 | 3/2009 | Bi et al. | |
| 2009/0075847 A1 | 3/2009 | Wawrzos et al. | |
| 2009/0082474 A1 | 3/2009 | Zhang et al. | |
| 2009/0110627 A1 | 4/2009 | Choi et al. | |
| 2009/0298684 A1 | 12/2009 | Zhou et al. | |
| 2010/0000441 A1 | 1/2010 | Jang et al. | |
| 2010/0024542 A1 | 2/2010 | Yen et al. | |
| 2010/0038263 A1 | 2/2010 | Zhou et al. | |
| 2010/0044646 A1 | 2/2010 | Zhamu et al. | |
| 2010/0176337 A1 | 7/2010 | Zhamu et al. | |

OTHER PUBLICATIONS

Chen, Q.W, et al., "Reduction of Carbon Dioxide by Magnetite: Implications for the Primordial Synthesis of Organic Molecules", Journal of the American Chemical Society, vol. 122, No. 5, pp. 970-971 (2000).

Tamaura, Yutaka, et al., "Complete Reduction of Carbon Dioxide to Carbon Using Cation-Excess Magnetite", Nature, vol. 346, Issue 6281, pp. 255-256 (1990).

Rao, Gopalakrishna M., "Electrolytic Production of Magnesium: Effect of Current Density", Journal of Applied Electrochemistry, vol. 16, No. 5, pp. 775-780 (1986).

Wallevik, Oddmund, et al., "Magnesium Electrolysis—A Monoplar Viewpoint", Magnesium Technology 2000, pp. 13-16 (1999).

American Chemistry Council, "Magnesium Chloride: Source of Magnesium for Alloys", http://chlorine.americanchemistry.com/Science-Center/Chlorine-Compound-of-the-Month-Library/Magnesium-Chloride-Source-of-Magnesium-for-Alloys, accessed Aug. 16, 2011.

Halmann, M., et al., "Magnesium Production by the Pidgeon Process Involving Dolomite Calcination and MgO Silicothermic Reduction: Thermodynamic and Environmental Analyses", Industrial & Engineering Chemistry Research, vol. 47, No. 7, pp. 2146-2154 (2008).

(Continued)

*Primary Examiner* — Stuart Hendrickson
(74) *Attorney, Agent, or Firm* — Edward S. Wright (57) ABSTRACT

Process for producing carbon nanospheres and other nano materials with carbon dioxide and magnesium. The carbon dioxide and magnesium are combusted together in a reactor to produce carbon nanospheres and magnesium oxide, which are then separated to provide the individual reaction products. The reaction occurs at a very high temperature, e.g. 2000° F.-5000° F. and also produces large amounts of useful energy in the form of heat and light, including infrared and ultraviolet radiation. Other oxidizing agents such as aluminum can be combined with the magnesium, and the metal oxides produced by the reaction can be recycled to provide additional oxidizing agents for combustion with the carbon dioxide. By varying the reaction temperature, the morphology of the carbon products can be controlled.

15 Claims, 6 Drawing Sheets

OTHER PUBLICATIONS

Rao, Anand, B., et al., "A Technical, Economic and Environmental Assessment of Amine-based CO2 Capture Technology for Power Plant Greenhouse Gas Control", Environmental Science Technology, vol. 36, Issue 20, pp. 4467-4475 (2002).
Figueroa, Jose D., et al., "Advances in CO2 capture technology—The U.S. Department of Energy's Carbon Sequestration Program", International Journal of Greenhouse Gas Control, vol. 2, Issue 1, pp. 9-20 (2008).
Haefeli, Susanne, et al., "Carbon Dioxide Capture and Storage Issues—Accounting and Baselines Under the United Nations Framework Convention on Climate Change (UNFCCC)", IEA Information Paper, International Energy Agency, 36 p. (2004).
Kim, Do Kyung, et al., "Spinel LiMn2O4 Nanorods as Lithium Ion Battery Cathodes", Nano Letters 2008, vol. 8, No. 11, pp. 3948-3952 (2008).
Jo, Minki, et al., "Nanoparticle-Nanorod Core-Shell LiNi0.5Mn1.5O4 Spinel Cathodes with High Energy Density for Li-Ion Batteries", Journal of the Electrochemical Society, vol. 157, No. 7, pp. A841-A845 (2010).
Fey, George Ting-Kuo, et al., "MgAl2O4 Spinel-Coated LiCoO2 as Long-Cycling Cathode Materials", Journal of Power Sources, vol. 146, Issues 1-2, pp. 245-249 (2005).
Shaju, K. M., et al., "Li Ion Kinetics Studies on Spinel Cathodes, Li(M1/6Mn11/16)O4 (M=Mn, Co, CoAl) by GITT and EIS", Journal of Materials Chemistry, vol. 13, Issue 1, pp. 106-113 (2003).
Liu, J., et al., "Improved Spinel Lithium Manganese Oxide as Cathode for High Power for Battery HEV Application", Electrochemical Society, Meeting Abstract 135, http://www.electrochem.org/dl/ma/202/pdfs/0135.PDF (2002).
Lee, Jeong K., et al., "Silicon Nanoparticles-Graphene Paper Composites for Li Ion Battery Anodes", Chemical Communications, vol. 46, Issue 12, pp. 2025-2027 (2010).
Stipe, Christopher B., et al., "Soot Particle Disintegration and Detection Using Two Laser ELFFS", Lawrence Berkeley National Laboratory, LBNL Paper LBNL-56636, http://www.escholarship.org/uc/item/9h65b3xb (2004).
He, Hong, "Nanocomposite Catalysts for Soot Combustion and Propane Steam Reforming", Massachusetts Institute of Technology, http://dspace.mit.edu/handle/1721.1/39347 (2007).
The Babcock & Wilcox Company, "Boiler Cleaning and Ash Handling Systems", Steam: Its Generation and Use, 41st Edition, Chapter 24, pp. 24-1, (2005).
Ganjipour, B., et al., Effect of Pressure on Morphology of the Grown Layers of Carbon Nanotubes by Modified Plasma-Enhanced Chemical Vapor Deposition, Fullerenes, Nanotubes and Carbon Nanostructures, vol. 13, Issue 1, pp. 365-373 (2005).
Luxmi, Shu Nie, et al., "Temperature-Dependence of Epitaxial Graphene Formation on SiC(0001)" Journal of Electronic Materials, vol. 38, Issue 6, pp. 718-724 (2009).
Hart, Anastasios John, "Chemical, Mechanical, and Thermal Control of Substrate-Bound Carbon Nanotube Growth", Massachusetts Institute of Technology, http://dspace.mit.edu/handle/1721.1/38257 (2006).
Ghosh, Suchismita, et al., "Lattice Thermal Conductivity of Graphene", American Physical Society, APS March Meeting, Abstract #V21.010 (2010).
Horing, N. J. M., et al., "Magneto-Response of Graphene", American Physical Society, APS March Meeting, Abstract #K1.181 (2010).
Faccio, Ricardo, et al., "Mechanical Properties of Graphene Nanoribbons", Journal of Physics: Condensed Matter, vol. 21, No. 28 (2009).
Das Sarma, Sankar, et al., "Transport and Electronic Structure of Bilayer Graphene", American Physical Society, APS March Meeting, Abstract #T21.001 (2010).
Frank, I. W., et al., "Mechanical Properties of Suspended Graphene Sheets", Journal of Vacuum Science & Technology B: Microelectronics and Nanometer Structures, vol. 25, Issue 6, pp. 2558-2561 (2007).
Neto, A. H. Castro, et al., "The Electronic Properties of Graphene", Reviews of Modern Physics, vol. 81, Issue 1, pp. 109-162 (2009).
Talapatra, Saikat, et al., "Ultrathin Graphene Membranes as Flexible Electrodes for Electrochemical Double Layer Capacitors", American Physical Society, APS March Meeting, Abstract #X21.008 (2010).
Sabio, J., et al., "Electrostatic Interactions between Graphene Layers and Their Environment", Physical Review B, vol. 77, Issue 19, pp. 1-8 (2008).
Pei, Q. X., et al., "A Molecular Dynamics Study of the Mechanical Properties of Hydrogen Functionalized Graphene", Carbon, vol. 48, Issue 3, pp. 898-904 (2010).
Crommie, Michael, "Graphene Under Strain Creates Gigantic Pseudo-Magnetic Fields", Lawrence Berkeley National Laboratory News Center, http://newscenter.lbl.gov/news-releases/2010/07/29/graphene-under-strain (2010).
Wang, Guoxiu, et al., "Graphene Nanosheets for Enhanced Lithium Storage in Lithium Ion Batteries", Carbon, vol. 47, Issue 8, pp. 2049-2053 (2009).
Stoller, Meryl D., et al., "Graphene-Based Ultracapacitors", Nano Letters, vol. 8, Issue 10, pp. 3498-3502 (2008).
Stankovich, Sasha, et al., "Graphene-Based Composite Materials", Nature, vol. 442, Issue 7100, pp. 282-286 (2006).
He, Yu-Shi, et al., "A Co(OH)2-Graphene Nanosheets Composite as a High Performance Anode Material for Rechargeable Lithium Batteries", Electrochemistry Communications, vol. 12., Issue 4, pp. 570-573 (2010).
Magnesium.com, "Cost Components", Magnesium Encyclopedia, Economic Aspects, http://www.magnesium.com/w3/data-bank/article.php?mgw=157&magnesium=211, accessed Aug. 16, 2011.
CheapTubes.com, "Cheaptubes.com: The Source for Low Cost Nanoscale Carbon Products Prices", http://cheaptubes.com/carbon-nanotubes-prices.htm, accessed Aug. 16, 2011.
Wikipedia Contributors, "Pidgeon Process", Wikipedia, The Free Encyclopedia, http://en.wikipedia.org/wiki/Pidgeon_Process, accessed Aug. 16, 2011.
Mintmire, John, et al., "A Twist on Graphene Nanoribbons", American Physical Society, APS March Meeting, Abstract #P21.002, (2010).
Lu, Guanhua, et al., "Facile, Noncovalent Decoration of Graphene Oxide Sheets with Nanocrystals", Nano Research, vol. 2, No. 3, pp. 192-200, (2009).
Zayan, M. H., et al., "High Temperature Oxidation of Al-Mg Alloys", Oxidation of Metals, vol. 34, No. 3-4. pp. 323-333 (1990).
Foote, J. P., et al., "Powdered Magnesium-Carbon Dioxide Rocket Combustion Technology for In Situ Mars Propulsion", NASA Technical Report, No. NASA/TP-2007-215077, M-1203, (2007).
King, Merrill K., "A Simplified Two Reaction Zone Model of Magnesium Combustion in Carbon Dioxide", Proceedings of the Combustion Institute, vol. 29, Issue 2, pp. 2931-2938 (2002).
Steel, Steven, "Ceramic Materials for Reusable Liquid Fueled Rocket Engine Combustion Devices", The Amptiac Quarterly, vol. 8, No. 1, pp. 39-43 (2004).
Rich, David, et al., "Production of Solid Carbon through Reduction of Gaseous Carbon Dioxide with Magnesium", private presentation document from Reax Engineering, Inc. to High Temperature Physics, LLC (2010).
Shafirovich, Evgeny Ya., et al., "Combustion of Magnesium Particles in Carbon Dioxide and Monoxide", AIAA 95-2992, 31st AIAA/ASME/SAE/ASEE Joint Propulsion Conference and Exhibit, San Diego, CA, (1995).
Levchenko, I., "The Large-Scale Production of Graphene Flakes Using Magnetically-Enhanced Arc Discharge Between Carbon Electrodes", Carbon, vol. 48, Issue 15, pp. 4570-4574, (2010).
Wikipedia Contributors, "Graphene", Wikipedia, The Free Encyclopedia, http://en.wikipedia.org/wiki/Graphene, accessed Aug. 16, 2011.
Graphene Industries Limited, "What is graphene?", http://grapheneindustries.com/?What+is+graphene%3F, accessed Aug. 16, 2011.
Park, Sungjin et al., "Chemical Methods for the Production of Graphenes", Nature Nanotechnology, vol. 4, No. 4, pp. 217-224 (2009).
Geim, A.K., et al., "The Rise of Graphene", Nature Materials, vol. 6, No. 3, pp. 183-191 (2007).

Lee, Changgu, et al., "Measurement of the Elastic Properties and Intrinsic Strength of Monolayer Graphene", Science, vol. 321, No. 5887, pp. 385-388 (2008).

Bolen, Michael L., et al., "Graphene Formation Mechanisms on 4H-SiC(0001)", Physical Review B, vol. 80., Issue 11, pp. 1-9 (2009).

Obraztsov, Alexander N., "Chemical Vapour Deposition: Making Graphene on a Large Scale", Nature Nanotechnology vol. 4, No. 4, pp. 212-213 (2009).

Lu, Xuekun, et al., "Patterning of Highly Oriented Pyrolytic Graphite by Oxygen Plasma Etching", Applied Physics Letters, vol. 75, No. 2, pp. 193-195 (1999).

Park, Sungjin, et al., "Colloidal Suspensions of Highly Reduced Graphene Oxide in a Wide Variety of Organic Solvents", Nano Letters, vol. 9, No. 4, pp. 1593-1597 (2009).

Chakrabarti, Amartya, et al., "Conversion of Carbon Dioxide to Few-Layer Graphene", Journal of Materials Chemistry, vol. 21, pp. 9491-9493 (2011).

Alford, J.M., et al., "A Carbon Arc Apparatus for Production of Nanotubes in Microgravity", Seventh International Workshop on Microgravity Combustion and Chemically Reacting Systems, NASA, pp. 69-72, (2003).

Ando, Yoshinori, et al., "Preparation of Carbon Nanotubes by Arc-Discharge Evaporation", Japanese Journal of Applied Physics, vol. 32, No. 1A/B, pp. L107-L109 (1993).

Byon, Eungsun, et al., "Coalescence of Nanometer Silver Islands on Oxides Grown by Filtered Cathodic Arc Deposition", Applied Physics Letters, vol. 82, No. 10, pp. 1634-1636 (2003).

Qian, Wen, et al., "Low Temperature Synthesis of Carbon Nanospheres by Reducing Supercritical Carbon Dioxide with Bimetallic Lithium and Potassium", Carbon, vol. 44, Issue 7, pp. 1303-1307 (2006).

Ng, K.W., et al., "Kinetics of MgO Chlorination with HCl Gas", Metallurgical and Materials Transactions B, vol. 36, No. 3, pp. 405-409 (2005).

Sutter, Peter W. et al., "Epitaxial Graphene on Ruthenium", Nature Materials, vol. 7, No. 5, pp. 406-411 (2008).

Wang, W.H. et al., "Growth of Atomically Smooth MgO Films on Graphene by Molecular Beam Epitaxy", Applied Physics Letters, vol. 93, No. 18, pp. 183107-1-183107-3 (2008).

PROCESS FOR THE PRODUCTION OF CARBON NANOPARTICLES AND SEQUESTRATION OF CARBON

RELATED APPLICATION

Provisional Application No. 61/326,168, filed Apr. 20, 2010, the priority of which is claimed.

BACKGROUND OF THE INVENTION

1. Field of Invention

This invention pertains generally to the production of carbon products and nanomaterials and to the sequestration of carbon, more particularly, to a process for producing carbon nanospheres and other carbon products in a manner that also provides carbon sequestration.

2. Related Art

Much recent research and interest has been focused on spherical carbon nanomaterials such as buckyballs and nanospheres. These materials have a number of unique and desirable qualities which can lead to broad, new, high value carbon markets. Carbon nanospheres have, for example, been shown to be highly effective when used as lubricants for machinery, when used as additives to fuel, and when utilized in coatings on pipeline walls for reducing fluid-flow pressure losses in the pipelines. Such materials may also have application in electronics, batteries, medicine, catalysis, structural fabrication, nuclear energy, and other fields as well.

While many potential applications for spherical carbon nanomaterials have been identified, it appears that the development of such applications has been severely hindered by the high cost and limited availability of the materials. With the price of carbon nanomaterials currently on the order of $500 per pound, the specialized market for such materials is small and largely academic, amounting perhaps to a few hundred pounds per year, worldwide.

Heretofore, there have been attempts to produce carbon nanospheres and other carbon products from $CO_2$. However, $CO_2$ is a very stable molecule, and the creation of $CO_2$ is highly exothermic, which means that a considerable amount of energy is required in any process involving the reduction of $CO_2$ to carbon. $CO_2$ can be reduced partially and rendered inert as a constituent in a complex molecule, and it can be reduced completely to carbon by a number of processes. However, the chemical thermodynamics of $CO_2$ reduction generally prohibit economic reduction of $CO_2$ to carbon, and virtually all methods heretofore employed in reducing $CO_2$ to carbon are limited by mass flow requirements, energy requirements, cost of the reactants, and inadequate value of the end products.

When carbon-based fuels such as coal, oil, and gas are combusted to generate heat, sizable amounts of $CO_2$ are produced, and with concerns about increasing amounts of $CO_2$ in the atmosphere causing global warming and acidification of the oceans, it would be highly desirable if some of this $CO_2$ could be captured and utilized in the low cost production of useful products such as carbon nanospheres and other carbon products.

OBJECTS AND SUMMARY OF THE INVENTION

It is, in general, an object of the invention to provide a new and improved process for the production of carbon nanospheres and other carbon products.

Another object of the invention is to provide a process of the above character which makes possible the production of carbon nanospheres in large volume and at low cost.

Another object of the invention is to provide a process of the above character which also provides carbon sequestration.

These and other objects are achieved in accordance with the invention by providing a process for producing carbon nanospheres and other nano materials with carbon dioxide and magnesium. The carbon dioxide and magnesium are combusted together in a reactor to produce carbon nanospheres and magnesium oxide, which are then separated to provide the individual reaction products. The reaction occurs at very high temperatures, e.g. 2000° F.-5000° F. and also produces large amounts of useful energy in the form of heat and light, including infrared and ultraviolet radiation. Other oxidizing agents such as aluminum can be combined with the magnesium, and the metal oxides produced by the reaction can be recycled to provide additional oxidizing agents for combustion with the carbon dioxide. By varying the reaction temperature and the nature or the composition of the materials used, the morphology of the carbon products can be controlled.

DETAILED DESCRIPTION

Figure 1:
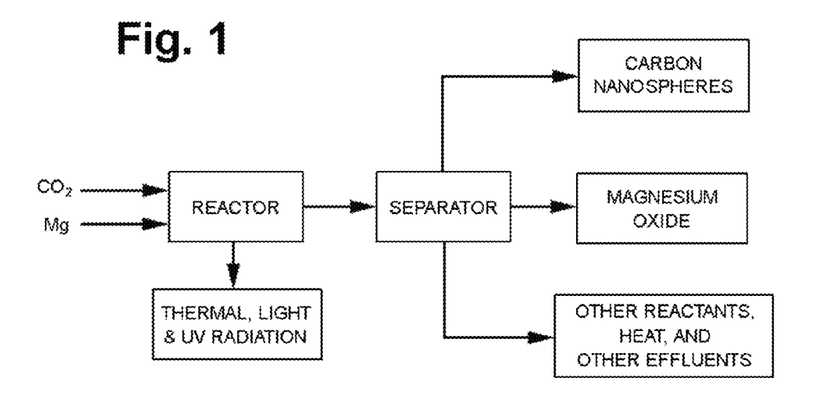
FIG. 1 is a flow chart of a process for producing hollow carbon nanospheres and other products in accordance with the invention.

In the process of the invention, $CO_2$ is combusted or reduced with magnesium in a high temperature furnace to form various carbon morphologies or products, including hollow carbon nanospheres. As illustrated in FIG. 1, magnesium and $CO_2$ are introduced into a reactor where combustion occurs, producing a heterogeneous mixture of carbon nanospheres and magnesium oxide. The reaction takes place at temperatures on the order of 2000° F.-5000° F. and, as a result, also produces intense amounts of high temperature, infrared, light and ultraviolet radiation which can be captured and utilized. The carbon nanospheres and other carbon products are separated from the magnesium oxide and from any reaction by-products that may be present, and heat from the separator is recovered.

The temperature of reaction can be varied to control the morphology of the hollow carbon nanospheres that are produced. The diameter of the nanospheres can thus be adjusted from about 2 nm to at least 500 µm. If desired, other forms of nanocarbon, graphite and amorphous carbon can also be produced by varying the temperature of reaction and/or introducing catalytic material into the reaction. In the preferred embodiment, in which the reaction product contains a heterogeneous mixture of hollow carbon nanospheres and magnesium oxide, the hollow carbon nanospheres can be separated from the reaction product by established processes such as acid treatment, floatation, or annular flow separation.

The magnesium is introduced in the form of particles, and for best combustion, larger particles may be preferred since magnesium can be difficult to ignite if the particles are too small. In that regard, chips having a size on the order of 5-10 mesh have been found to ignite and burn very well in a CO2 environment, whereas finer sizes, e.g. 30-240 mesh, would not ignite unless mixed with larger particles or with another material such as aluminum.

Figure 2:
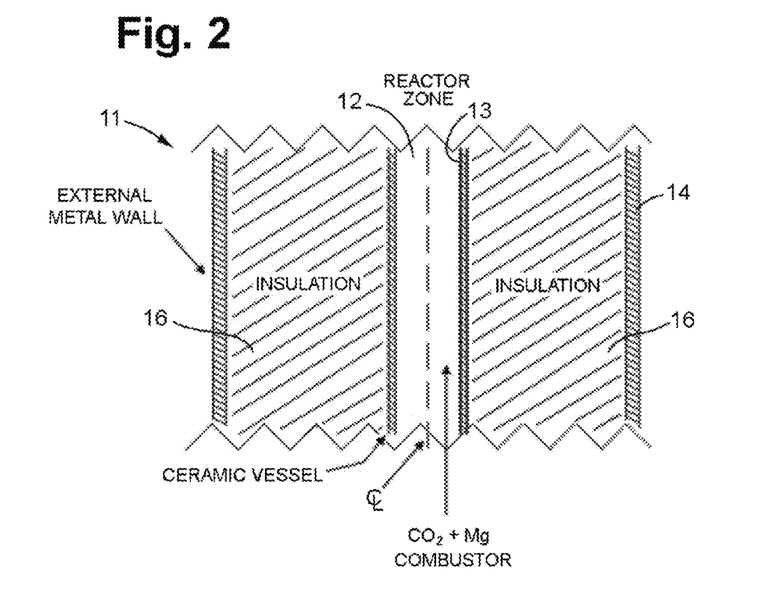
FIG. 2 is a vertical sectional view of one embodiment of a reactor for carrying out the process of the invention.
Figure 3:
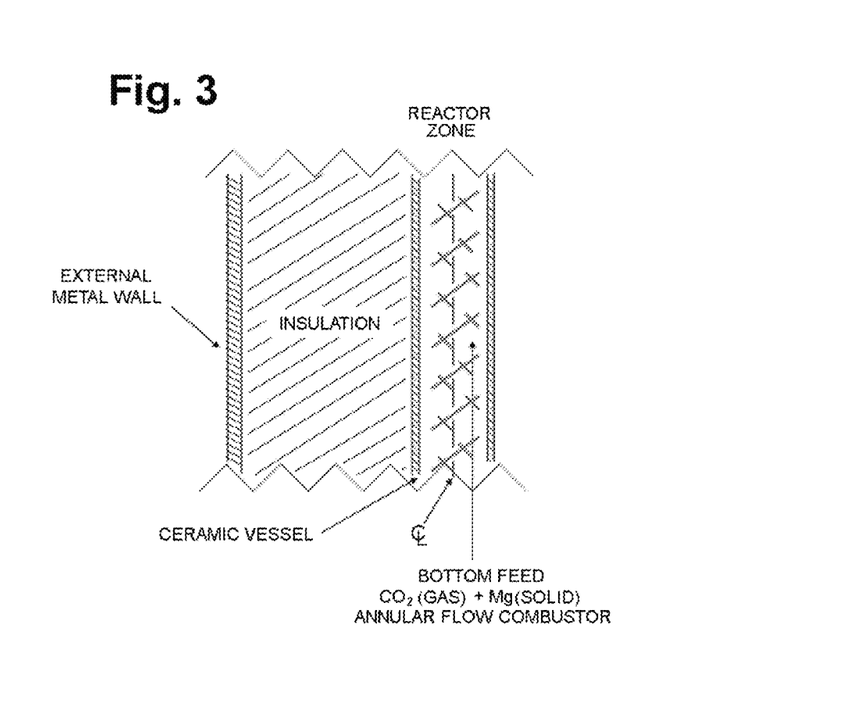
FIGS. 3-7 are fragmentary vertical sectional views illustrating one embodiment of the process being carried out in the reactor of FIG. 2.
Figure 4:
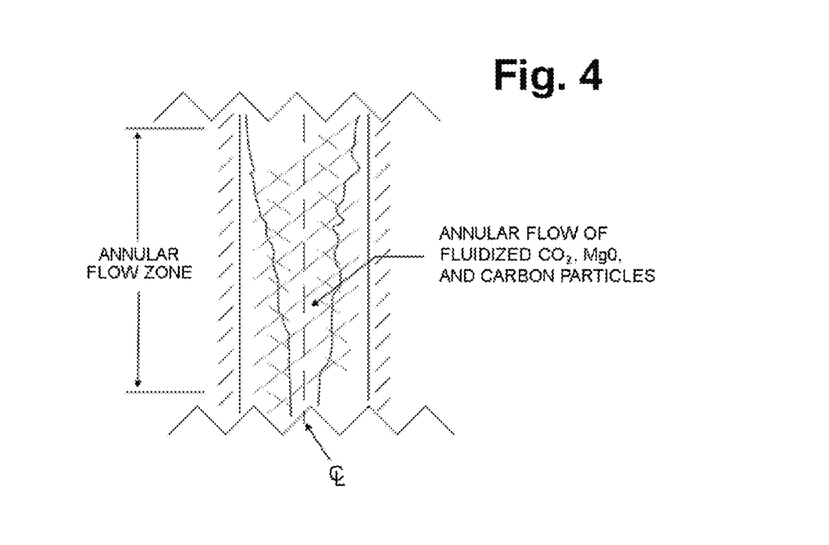
Figure 5:
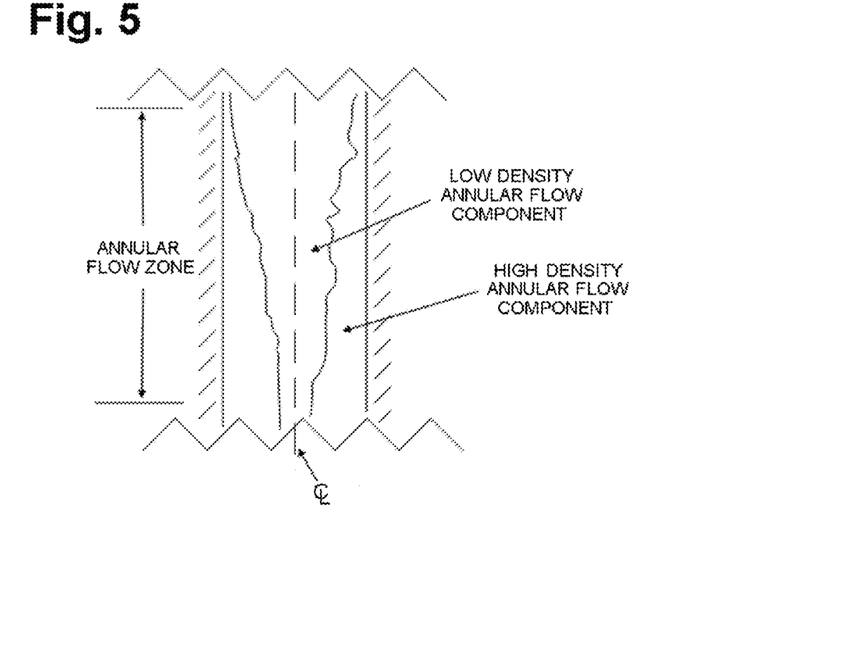

In the preferred embodiment, combustion and separation are carried out in a heavily insulated reactor such as the one illustrated in FIG. 2. This reactor, designated generally by the reference numeral 11, has a reaction chamber 12 surrounded by a ceramic cylindrical wall 13, with an outer wall 14 and insulation 16 between the walls. The chamber wall must be capable of withstanding temperatures on the order of 2000° F.-5000° F. and can, for example, be fabricated of a mixture of zirconia and rare earth oxide, or another suitable high temperature resistant, insulative material. The outer wall is fabricated of metal and is cooled to dissipate any heat which passes through the insulation.

If desired, the reactor vessel can be a pressure vessel such that high pressure CO2 can be injected in order to obtain certain carbon products. The reactor can be a batch process reactor or a continuous process reactor.

Figure 6:
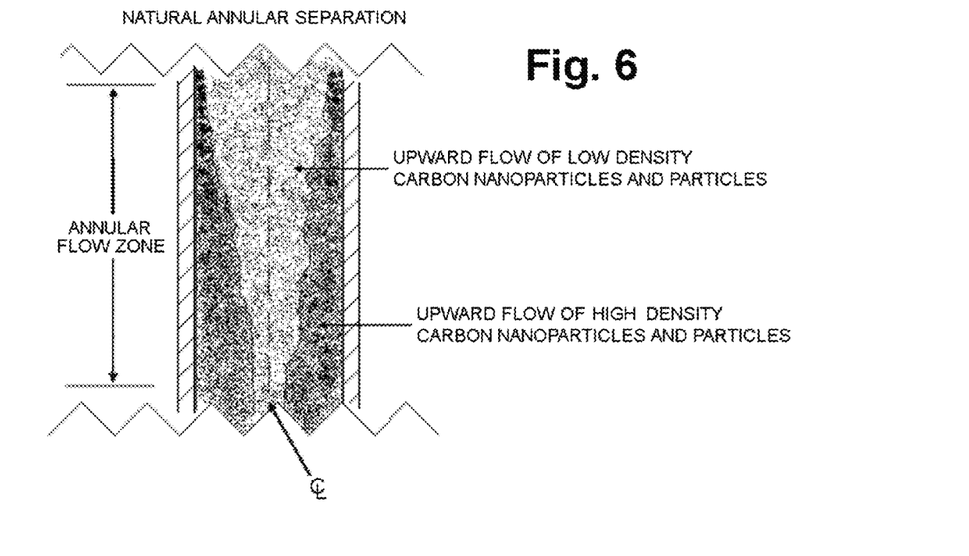

FIGS. 3-10 illustrate the use of the reactor as an annular flow combustor and the separation of hollow carbon nanospheres and magnesium oxide in an annular flow process. In this embodiment, CO2 gas and solid magnesium particles are fed into the lower portion of chamber 12 and ignited to produce an upwardly directed annular flow of fluidized CO2, magnesium oxide, and carbon particles, with a high density annular flow component in the outer portion of the chamber and a low density annular flow component in the inner region. Thus, as illustrated in FIG. 6, there is an upward flow of high density, heated carbon nanoparticles and magnesium oxide particles in the outer portion of the chamber and an upward flow of low density, heated carbon nanoparticles and magnesium oxide particles in the inner region, with the inner region expanding outwardly as the flows progress.

Figure 7:
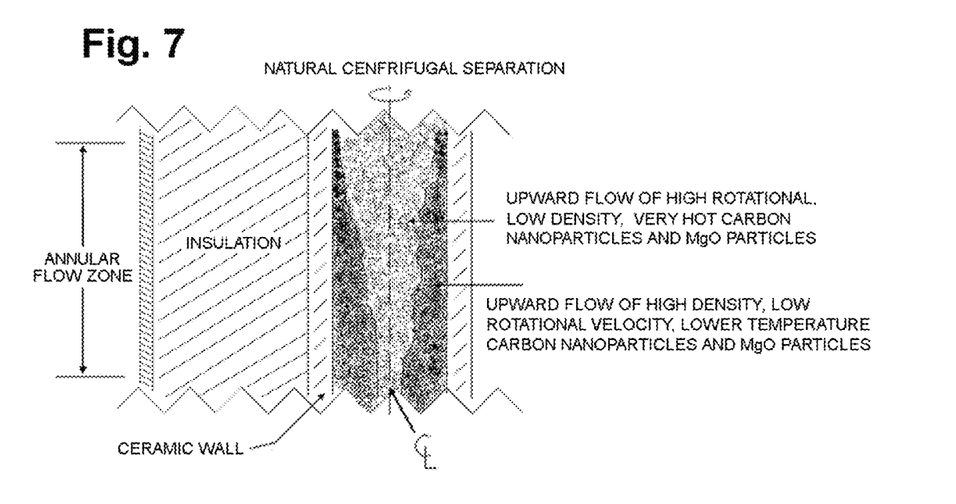

As the reaction products travel upwardly through the annular flow zone, they also acquire a rotational component of velocity which further aids in the separation process. Thus, as illustrated in FIG. 7, the upward flow of high density, low rotational velocity, lower temperature carbon nanoparticles and magnesium oxide particles occurs in the outer portion of the chamber, and the upward flow of high rotational velocity, low density, very hot carbon nanoparticles and magnesium oxide particles occurs in the inner region.

In a laboratory implementation, two sheets of dry ice were used as a source of carbon dioxide and as a test bed and cover for the reaction. The sheets were approximately 12 inches square and 1½ inches thick. Five test bed cavities measuring 1⅜ inches in diameter and 1 inch deep were formed in an X-shaped pattern in one of the sheets, with a vent groove extending from the center cavity to an outer edge of the sheet to prevent explosion of the combusting material. The center cavity was filled level with approximately 25 grams of 99% pure magnesium chips that had been screened through a # 5 mesh sieve.

The magnesium chips were ignited by a propane torch, and the cover sheet was quickly placed over the test bed sheet. The magnesium burned very brightly, gases escaped from the vent, and the UV emissions were extremely bright. The total burn time was less than a minute, and combustion of the magnesium was virtually complete, with no visible magnesium remaining The experiment was repeated several times, and the residue and products of combustion from each test were collected. The heterogeneous mixtures of magnesium oxide (MgO) and carbon were put in a 4 M solution of hydrochloric acid for several minutes. The MgO went into solution with the HCl, and the carbon in solid form. The carbon products were separated from the solution by filtering them with a 1 micron filter. The solid carbon product which remained in the filter was then washed several times with ethanol and distilled water, and left to dry overnight on a paper towel.

Figure 8:
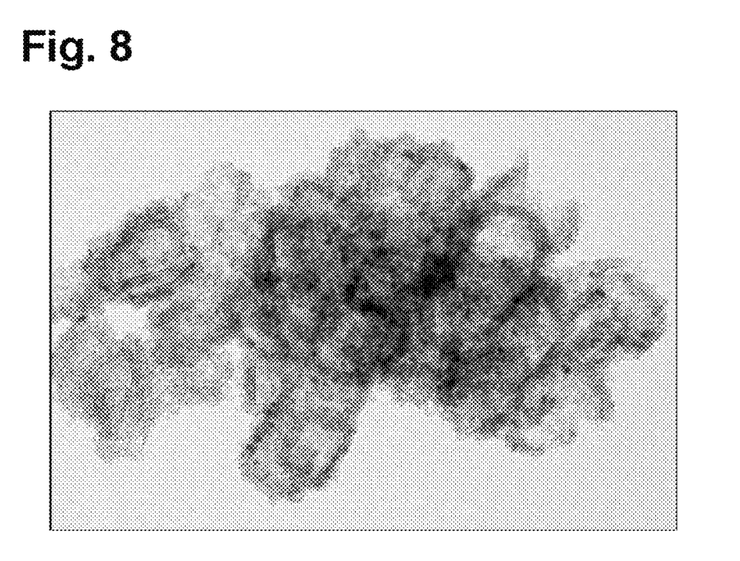
FIG. 8 is a TEM scan of hollow carbon nanospheres produced by the process of the invention.
Figure 9:
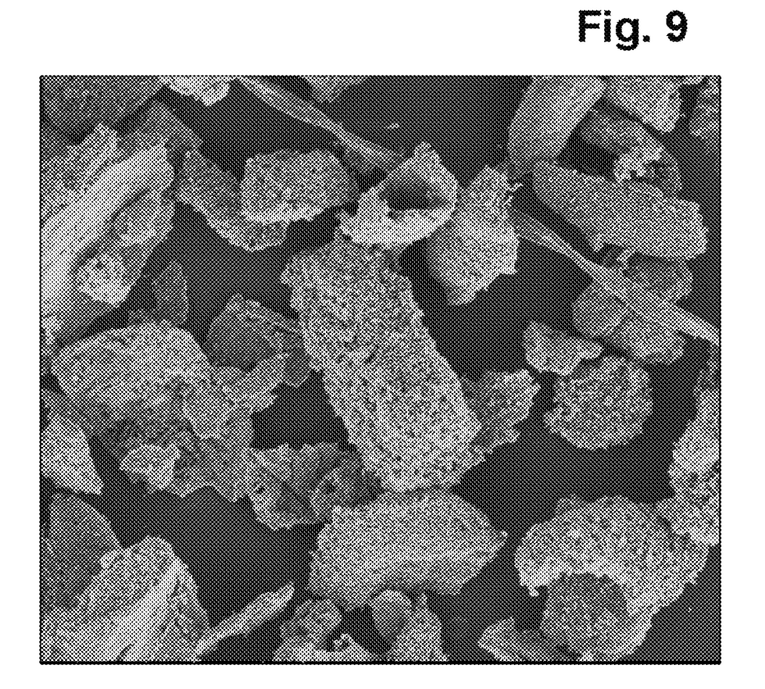
FIGS. 9 and 10 are SEM scans of hollow carbon nanospheres produced by the process of the invention.
Figure 10:
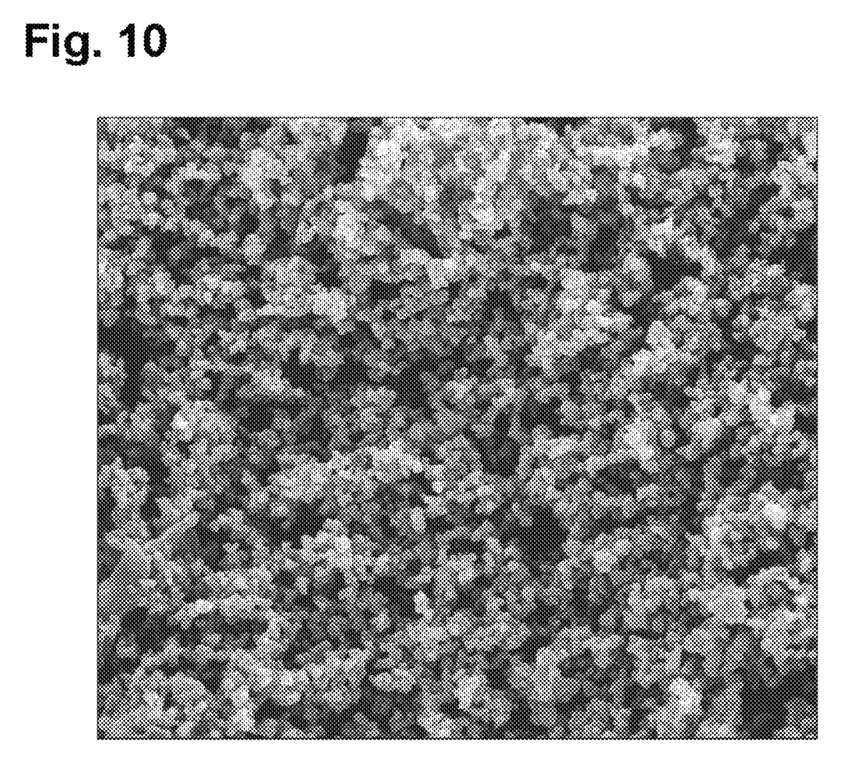

As can be seen in FIG. 8, transmission electron microscopy (TEM) analysis of the carbon particles has shown them to be spherical and hollow in nature and approximately 400 nanometers in diameter. The particles were agglomerated, and no soot was observed. Scanning electron analysis of the carbon particles has shown them to be agglomerated in an unusual organized structure having a high surface area, as can be seen in FIGS. 9 and 10 which show the agglomerated material and the surface of that material.

The reaction temperature of 2000° F.-5000° F. is unusually high and in a range that heretofore could be achieved only with solar furnaces. This high temperature heat can be captured and utilized in high temperature manufacturing processes or in the production of electrical power.

If desired, the magnesium oxide and other metal oxides produced by the reaction can recycled and converted internally to additional magnesium and other metals which are combusted with the CO2 to produce additional CO2 and oxides. The reduction of MgO to magnesium is an endothermic, energy intensive, electrolytic process which requires approximately 35 to 40 Megawatts of energy per ton and can be sustained by power generated with the heat produced by the Mg—CO2 reaction. That power can also be produced by another green, non-carbon emitting process such wind generated power or power produced by solar energy.

Power or heat captured from the reactor can supplement green, non-CO2-emitting sources of power to recycle the magnesium and other reactants to form a closed loop carbon sequestration system that converts CO2 to carbon products with no associated CO2 emissions.

When the CO2 is captured from the emissions of fossil fuel combustion and the magnesium is recycled with heat from the magnesium-carbon dioxide reaction and/or power produced by a process that does emit carbon dioxide, the process is a bona fide carbon sequestration process in which CO2 emissions from fossil fuel combustion are captured, fed into the 002-magnesium reactor, and converted to carbon products with no emissions of CO2.

Figure 11:
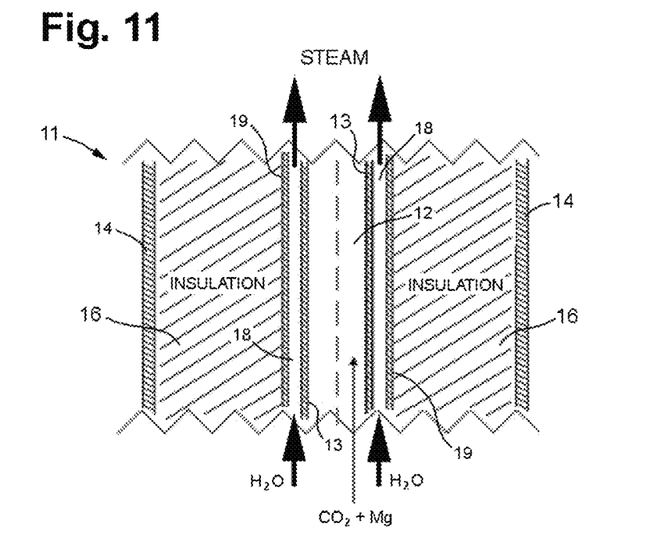
FIG. 11 is a vertical sectional view of another embodiment of a reactor for use in producing hollow carbon nanospheres and other products in accordance with the invention.

The embodiment illustrated in Figure 11 is generally similar to the embodiment of FIG. 2, and like reference numerals designate corresponding elements in the two. This embodiment also has a steam jacket 18 surrounding reaction chamber 12 for utilizing heat produced by the combustion reaction. With the high reaction temperatures, water flowing through the jacket is converted to high temperature steam which can, for example, be used in generating electrical power as well as in heating and other applications. The steam jacket has a cylindrical outer wall 19 which is spaced from and disposed coaxially of wall 13 of the reaction chamber, with wall 13 serving as the inner wall of the steam jacket. Like wall 13, outer wall 19 is fabricated of a ceramic material that can withstand the high temperatures of the reaction.

The invention has a number of important features and advantages. It is capable of producing carbon nanospheres and other carbon products in significantly greater volume and at substantially lower cost than has heretofore been possible. With magnesium available at a cost of $1.25 per pound and $CO_2$ being available at little cost or possibly with a small subsidy, the cost of hollow carbon nanospheres produced by the invention will be on the order of $5 to $8 per pound, which is less than 1/50th of the current cost ($500 per pound) of hollow carbon nanospheres produced by other processes.

Carbon nanospheres produced by the invention are non-toxic and are likely to be less controversial than other nano-products such as carbon nanotubes in terms of health and regulation. They also have a uniquely proven capability to reduce friction and mechanical wear and tear when used for lubrication, and when employed in pipeline applications, they can significantly reduce friction and enable substantially more fluid to be transmitted through the same pipe with the same mechanical compressors that are currently used.

Another potential application for hollow carbon nanospheres produced by the invention is as containers both for nuclear reactor fuel (e.g., uranium carbide) and for the resulting fission products to provide a safe, sealed, high temperature, gas-cooled nuclear reactor fuel system.

Other potential applications abound for the carbon nanospheres produced by the invention. These include the use of carbon nanospheres as constituents in lithium and vanadium batteries, as super light proppants for oil and gas production, as medical delivery devices, and more.

To successfully enhance well productivity or injectivity, a created fracture must have permeability (leading to conductivity) orders of magnitude greater than the reservoir matrix permeability. When pumping has ceased and the imparted hydraulic fluid pressure has dropped below that required to keep the fracture open, the fracture may close, and in doing so, substantially eliminate the desired conductive pathway to the wellbore. Proppants, or propping agents, are placed in the fracture to maintain the flow path after the treating pressure is relieved. Ideally, the proppant will provide flow conductivity large enough to minimize pressure losses in the fracture during production. In practice, this may not always be achieved because the selection of a proppant involves many compromises imposed by economic and practical considerations.

From all chemicals and materials, and all the services provided as a part of the hydraulic fracturing operation, only one thing will provide benefit to the productivity improvement of the well: Proppant! Selecting the correct proppant to use, the amount to place, and the propped fracture geometry is therefore at the heart of a successful application of hydraulic fracturing.

The Mg—CO2 process also produces important by-products such as magnesium oxide (MgO) and a substantial amount of heat and electromagnetic radiation. The reaction is exothermic, producing a flux of high temperature infrared, light and ultraviolet radiation. The reaction temperature of 2000° F.-5000° F. is unusually high, very difficult to produce by conventional combustion processes, and may have significant process utility itself. The heat can be used to generate electricity that can be utilized by the invention in recycling MgO for internal production of additional magnesium. Alternatively, the high quality energy can be put to other uses in a secondary process or within the process of the Invention itself.

When the CO2 is captured from the emissions of fossil fuel combustion and the magnesium is recycled with heat from the magnesium-carbon dioxide reaction and/or power produced by a process that does emit carbon dioxide, the process is a bona fide carbon sequestration process in which CO2 emissions from fossil fuel combustion are captured, fed into the 002-magnesium reactor, and converted to carbon products with no emissions of CO2.

Moreover, by varying the temperature, speed and constituents of the reaction, the morphologies of the carbon products can be controlled. Thus, for example, by varying the temperature, the diameter of the carbon nanomaterials can be adjusted between about 2 nm and more than 500 μm, and by varying the temperature a few hundred degrees, the product can be changed from carbon nanospheres to carbon nanotubes.

Finally, the invention can play an important role in the reduction of global warming and ocean acidification by turning the massive quantities of CO2 produced by combustion of coal and other fossil fuels into high value, useful carbon materials that are inert, recyclable, and/or incombustible. In so doing, it provides an attractive alternative to methods such as sequestration for disposing of the CO2 from effluent streams.

It is apparent from the foregoing that a new and improved process for producing hollow carbon nanospheres and other carbon products has been provided. While only certain presently preferred embodiments have been described in detail, as will be apparent to those familiar with the art, certain changes and modifications can be made without departing from the scope of the invention as defined by the following claims.

The invention claimed is:

1. A process for producing a carbon product, comprising the steps of combusting carbon dioxide and magnesium together at a temperature of about 2000° F.-5000° F. to produce carbon nanoparticles, magnesium oxide, and heat and light energy, separating the carbon nanoparticles from the magnesium oxide and any other reaction products, and recovering the separated carbon nanoparticles.

2. The process of claim 1 wherein the carbon dioxide and magnesium are combusted in a manner that produces a temperature of about 2000° F. -5000° F.

3. The process of claim 1 wherein heat produced by the reaction is captured.

4. The process of claim 1 wherein heat produced by the reaction is utilized in generating electricity.

5. The process of claim 1 wherein infrared and ultraviolet energy produced by the reaction is captured.

6. The process of claim 1 wherein magnesium is recovered from the magnesium oxide, recycled, and combusted with the carbon dioxide.

7. The process of claim 1 wherein an oxidizing agent is combined with the magnesium for combustion with the carbon dioxide.

8. The process of claim 7 wherein the oxidizing agent is aluminum.

9. A process for producing a carbon product, comprising the steps of reacting carbon dioxide with magnesium in a manner that produces a temperature of about 2000° F.-5000° F. to produce a carbon product, magnesium oxide, and heat and light energy, and separating the carbon product from the magnesium oxide and any other reaction products.

10. The process of claim 9 wherein at least some of the heat and light energy produced by the reaction is captured.

11. The process of claim 9 wherein magnesium is recovered from the magnesium oxide, recycled, and combusted with the carbon dioxide.

12. The process of claim 9 wherein an oxidizing agent is combined with the magnesium for combustion with the carbon dioxide.

13. The process of claim 12 wherein the oxidizing agent is aluminum.

14. A process of producing carbon products and sequestering carbon, comprising the steps of: capturing carbon dioxide from emissions of fossil fuel combustion, combusting the carbon dioxide with magnesium to produce carbon particles and magnesium oxide, recovering magnesium from the magnesium oxide using heat from the magnesium-carbon dioxide reaction and/or power produced by a process that does not emit carbon dioxide, and combusting the recovered magnesium with the carbon dioxide, whereby the carbon dioxide emissions are captured and converted to carbon products without emitting carbon dioxide.

15. The process of claim 14 wherein the magnesium is recovered and recycled with power produced by solar energy or by wind energy.

* * * * *